(12) United States Patent
Yang

(10) Patent No.: US 7,248,551 B2
(45) Date of Patent: Jul. 24, 2007

(54) APPARATUS AND METHOD FOR CONTROLLING LASER POWER FOR DISC DRIVE

(75) Inventor: Sung-un Yang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 435 days.

(21) Appl. No.: 10/438,201

(22) Filed: May 15, 2003

(65) Prior Publication Data
US 2003/0214893 A1   Nov. 20, 2003

(30) Foreign Application Priority Data
May 17, 2002   (KR) ............................... 2002-27351

(51) Int. Cl.
*G11B 7/00* (2006.01)
(52) U.S. Cl. .................................. 369/47.51; 369/53.27
(58) Field of Classification Search ............ 369/47.52, 369/53.26, 53.27, 53.37, 116
See application file for complete search history.

(56) References Cited

U.S. PATENT DOCUMENTS

| | | | |
|---|---|---|---|
| 6,115,350 A * | 9/2000 | Furuta et al. ............ 369/47.53 |
| 6,339,578 B1 * | 1/2002 | Sasaki et al. ............... 369/116 |
| 6,741,041 B2 * | 5/2004 | Tateishi et al. ............. 315/224 |
| 6,785,211 B2 * | 8/2004 | Lee et al. ................ 369/53.26 |
| 6,798,728 B2 * | 9/2004 | Ota et al. ................... 369/116 |
| 2002/0167878 A1 * | 11/2002 | Nagano ................... 369/59.11 |
| 2004/0114482 A1 * | 6/2004 | Yano et al. .............. 369/47.52 |

FOREIGN PATENT DOCUMENTS

| | | |
|---|---|---|
| JP | 2000-082230 | 3/2000 |
| KR | 010068498 | 7/2001 |
| KR | 2001-0114241 | 12/2001 |

* cited by examiner

*Primary Examiner*—Tan Dinh
*Assistant Examiner*—Adam R. Giesy
(74) *Attorney, Agent, or Firm*—Staas & Halsey LLP (57) ABSTRACT

A laser power control apparatus and method prevent fluctuation in the level of laser power due to a difference between reaction speeds of an automatic power controller according to write speeds of a disc drive. In the apparatus and method, laser power can be automatically controlled to prevent a variation in the level of laser diode driving voltage in read power periods, according to the write speeds of a disc drive, in a write mode. Thus, it is possible to prevent unstable operations of a servo circuit due to a variation of the level of laser power and further, prevent deterioration in the quality of the servo circuit due to a variation in the level of a wobble signal, thereby stabilizing recording characteristics of the disc drive.

19 Claims, 6 Drawing Sheets

APPARATUS AND METHOD FOR CONTROLLING LASER POWER FOR DISC DRIVE

CROSS-REFERENCE TO RELATED APPLICATIONS

This application claims the priority of Korean Patent Application No. 2002-27351, filed on May 17, 2002 in the Korean Intellectual Property Office (KIPO), which is incorporated herein in its entirety by reference.

BACKGROUND OF THE INVENTION

1. Field of the Invention

The present invention relates to an apparatus and method controlling a disc drive, and more particularly, to a laser power control apparatus and method in a disc drive, which are capable of preventing fluctuations of laser power due to a variation in the reaction speed of an automatic power controller according to the write speed of a disc drive.

2. Description of the Related Art

In general, optical disc drives, e.g., CD drives, DVD drives, CD-ROM drives, and DVD-ROM drives, write or read data to or from a disc using an optical signal. Such a disc drive writes data to a disc by projecting light output from a laser diode onto the disc. Also, the disc drive reads data from a disc by projecting an optical signal output from the laser diode to the disc, using a lower laser power than that used for writing, converting the optical signal into an electrical signal using a light-receiving element, and processing the electrical signal.

During the writing and reading operations of the disc drive, an automatic power control circuit, which automatically controls a current used to drive the laser diode, is required to maintain a constant power level of an optical signal output to the laser diode.

Figure 1:
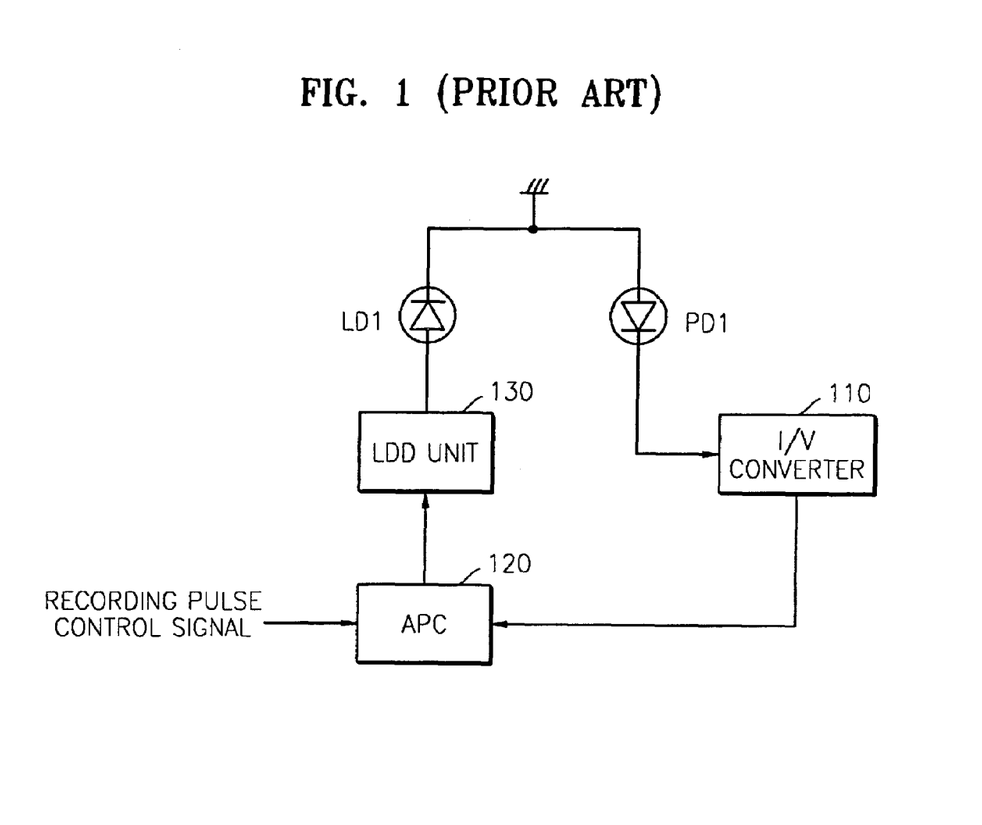
FIG. 1 is a circuit diagram of a conventional laser power controller in a disc drive.

Referring to FIG. 1, a conventional laser power control apparatus in a disc drive includes a laser diode LD1, a photodiode PD1, a current-to-voltage (I/V) converter 110, an automatic power controller (APC) 120, and a laser diode driving unit (LDD unit) 130.

Figure 2A:
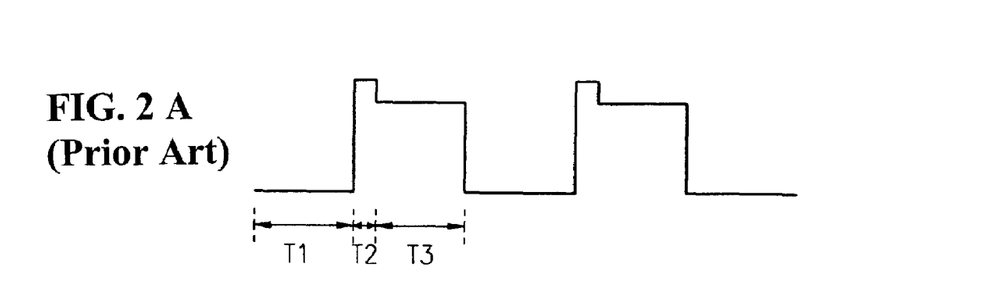
FIG. 2A is a waveform diagram of a laser power driving voltage output from an automatic power controller of FIG. 1.

The APC 120 generates a laser diode driving (LDD) voltage shown in FIG. 2A in response to a writing pulse control signal in a write mode. In detail, in a time interval T1, the APC 120 samples and holds the voltage of a signal output from the I/V converter 110 in response to a gate pulse in the time interval or period T1, compares the voltage with a predetermined read power reference value, and generates an LDD voltage having the same level as the read power reference value. In a time interval T3, the APC 120 samples and holds the voltage of a signal output from the I/V converter 110 in response to a gate pulse in the time interval T3, compares the sampled voltage with a predetermined write power reference value, and generates an LDD voltage having the same level as the write power reference value. In a time interval T2, which is the beginning of the write pulse, the APC 120 causes occurrence of overshoot for a predetermined time.

The LDD unit 130 converts the LDD voltage output from the APC 120 into a driving current and applies the driving current to the laser diode LD1. As a result, the laser diode LD1 outputs laser light.

Next, the laser light output from the laser diode LD1 is reflected from the disc and passes through the photodiode PD1, is converted into a current, which is an electrical signal, and applied to the I/V converter 110. Then, the electrical signal passing through the I/V converter 110 is converted into a voltage signal having a waveform shown in FIG. 2B and applied to the APC 120. Using a control loop of the conventional laser power control apparatus of FIG. 1, the power of laser light output from the laser diode LD1 can be maintained to be constant.

However, when the write speed of a disc drive increases, the reaction speeds of circuit devices of the APC 120 and optical devices such as the laser diode and the photodiode are lower than the reaction speed of the write speed of the disc drive, thereby causing fluctuations in laser power.

Figure 2B:
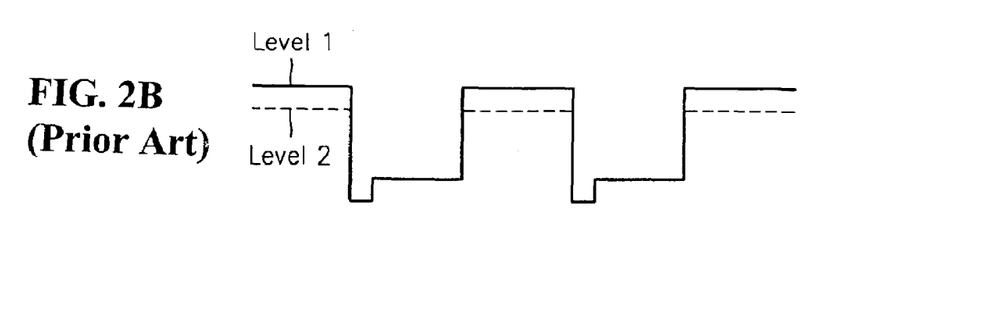
FIG. 2B is a waveform diagram of the voltage of a signal output from a current-to-voltage converter of FIG. 1.

As shown in FIGS. 2A and 2B, in a write mode at a low write speed, a voltage of level 1 is output from the I/V converter 110 in a read power interval T1. However, the time period between a read power interval and a write power interval becomes shorter at a high write speed; thus, write power of a write power interval T2 is applied to the I/V converter 110 before the read power interval T1 completely reaches a Level 1. As a result, the I/V converter 110 abnormally outputs a voltage of a Level 2 as read power.

Then, the APC 120 considers the read power, which is applied in a write mode at high write speed, as a voltage of level 2 and generates an LDD voltage to lower the read power level, thereby greatly lowering the level of read laser power.

Accordingly, the conventional laser power control apparatus of FIG. 1 is disadvantageous in that the read laser power level is abnormally lowered in a write mode at high write speed and it is difficult to detect various servo signals, such as a tracking error signal and a focus error signal, thereby deteriorating stable servo control. Also, the level of a detected wobble signal is not constant, and thus, the recording characteristics of a disc drive are degraded.

SUMMARY OF THE INVENTION

The present invention provides a laser power control apparatus and method used in a disc drive, which are capable of appropriately controlling write power and read power according to the write speed of a disc drive in order to prevent a variation in the level of laser power due to a variation in reaction speed of an automatic power controller according to the write speed of the disc drive.

According to one aspect of the present invention, an apparatus controlling laser power in a disc drive includes a memory unit which stores reference laser power data according to the write speeds, wherein the reference laser power data is set to compensate for a variation in driving voltage input to a laser diode; a system controller which reads reference laser power data corresponding to a set write speed from the memory unit in a write mode and generates a reference power control signal corresponding to the reference laser power data; and an automatic power controller which controls the level of voltage, which corresponds to an optical signal output from the laser diode, to be the same as that of the voltage of the reference power control signal.

According to another aspect of the present invention, a method of controlling laser power in a disc drive includes generating reference laser power data compensating for a variation in laser diode driving voltage according to the write speeds, and storing the reference laser power data in a memory unit; reading from the memory unit reference laser power data corresponding to write speed set in a write mode; and controlling the laser diode driving voltage so as to make the level of voltage corresponding to an optical signal output from laser diode of the disc drive be the same as that of voltage corresponding to the reference laser power data.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail preferred embodiments thereof with reference to the attached drawings in which.

DETAILED DESCRIPTION OF THE INVENTION

Detailed embodiments of the present invention are described below with examples illustrated in the accompanying drawings. Like reference numerals refer to like elements throughout the specification and the drawings.

Figure 3:
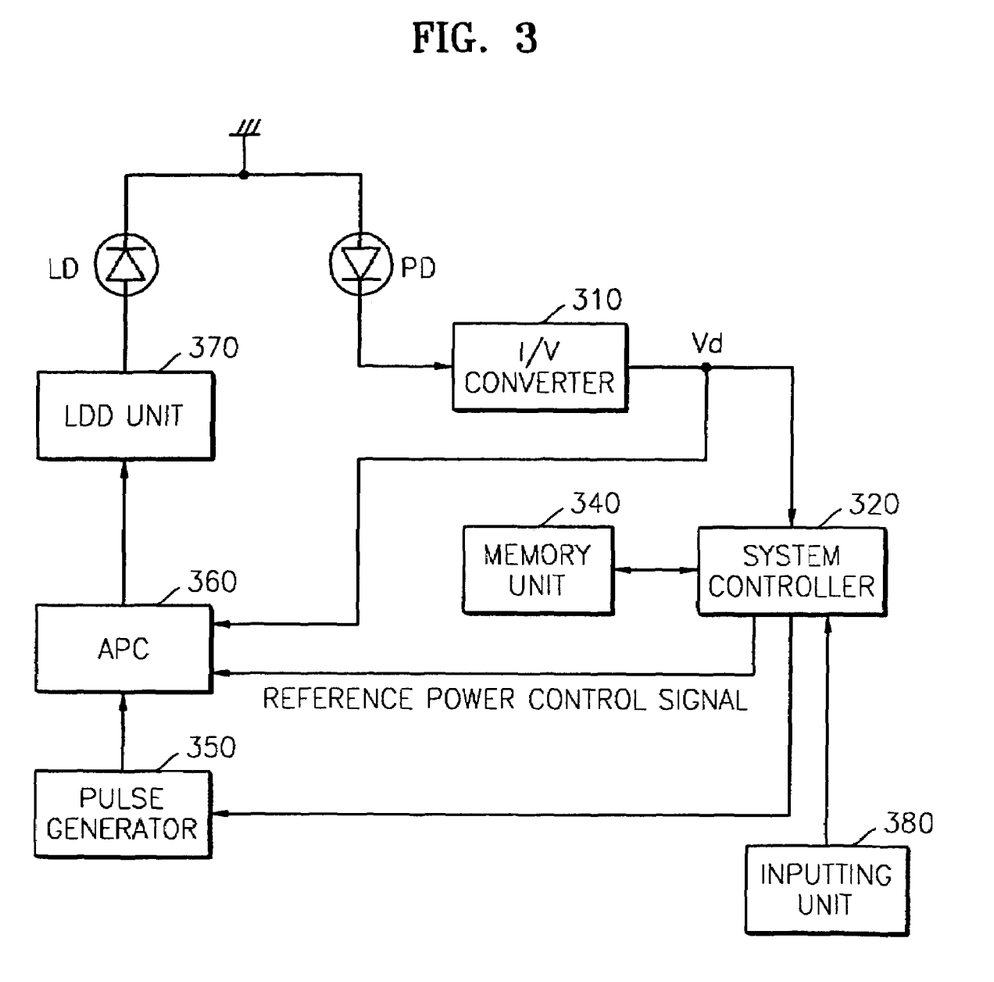
FIG. 3 is a block diagram of a laser power control apparatus in a disc drive according to an embodiment of the present invention.
Figure 4:
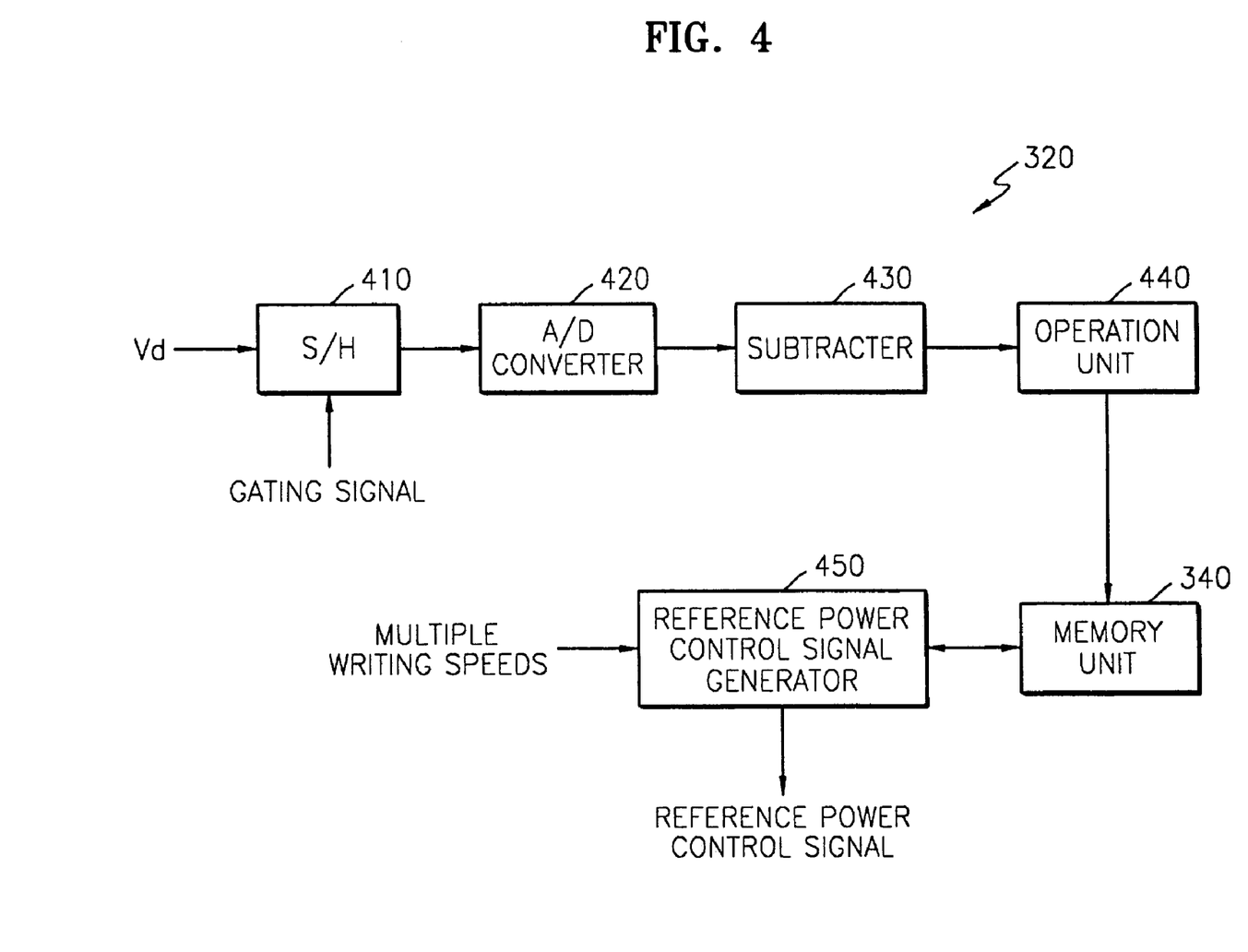
FIG. 4 is a block diagram of the structure of a system controller shown in FIG. 3.

FIG. 3 is a block diagram of a laser power control apparatus in a disc drive according to an embodiment of the present invention and FIG. 4 is a block diagram of the structure of a system controller 320 shown in FIG. 3.

Referring to FIG. 3, a laser power control apparatus in a disc drive, according to the present invention, includes a laser diode LD, a photodiode PD, a current-to-voltage (I/V) converter 310, the system controller 320, a memory unit 340, a pulse generator 350, an automatic power controller (APC) 360, a laser diode driving (LDD) unit 370, and an inputting unit 380.

The photodiode PD and the I/V converter 310, which is referred to as a 'photodetector' in this disclosure, may be a single assembly block.

The system controller 320 has a circuit construction as shown in FIG. 4 to perform processes of setting reference laser power data and controlling laser power.

The memory unit 340 stores reference laser power data compensating for a variation in a laser diode driving voltage according to the write speeds of a disc drive. In particular, reference laser power data for a read power period is generated by the system controller 320 having a circuit construction shown in FIG. 4. Also, the memory unit 340 stores reference laser power data for a write power period according to the write speed to automatically control laser power for a disc drive.

In a read mode, and a write mode corresponding to the write speed of a disc drive, an optical signal output from the laser diode LD is reflected from the disc and input to the photodiode PD and converted into a current which is an electrical signal. Next, when the electrical signal is applied to the I/V converter 310, the electrical signal is converted into a voltage signal Vd and input to the system controller 320 and the APC 360.

Figure 6A:
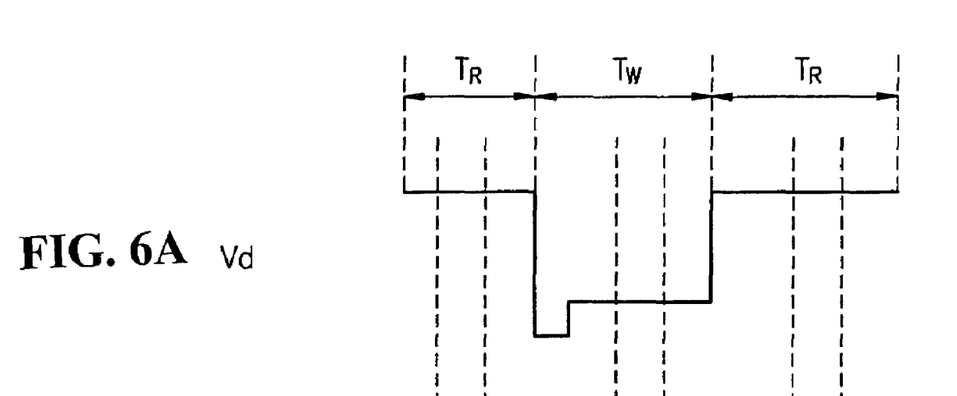
FIGS. 6A through 6C are waveform diagrams of major signals applied to the laser power control apparatus of FIG. 3.
Figure 6B:
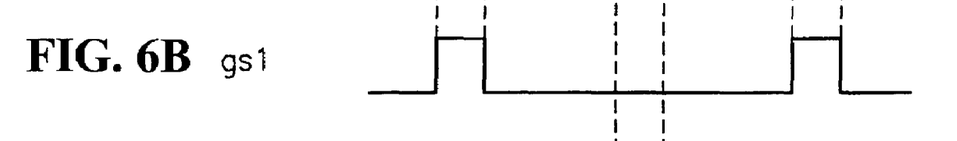

Then, as shown in FIG. 6B, a sampling and holding (SH) circuit 410 of the system controller 320 samples and holds the voltage signal Vd in a read power period and outputs the result, in response to a gating signal gs1.

When a system is controlled in a set mode, an analog-to-digital (A/D) converter 420 converts a sample and hold voltage, i.e., a read power, generated in a read mode, into digital data and also converts sample and hold voltages in read power period, which are determined according to the write speeds of a disc drive, in a write mode into digital data. The read power sample and hold voltage and sample and hold voltages in the read power period for the write mode are input to an analog-to-digital (A/D) converter 420 and converted into digital data.

Next, a subtracter 430 calculates the difference between the digital data, which is converted from the read power sample and hold voltage in the read mode, and the digital data, which is converted from the sample and hold voltage in the read power period determined according to the write speeds of the disc drive, in the write mode, and outputs the difference to the operation unit 440.

Upon receiving the voltage data difference, the operation unit 440 calculates reference laser power values, which are used to reduce a variation in the level of read power according to write speed in the write mode, to be proportional to the voltage data differences calculated by the subtracter 430. The obtained reference laser power values according to write speeds are stored in the memory unit 340.

Figure 7:
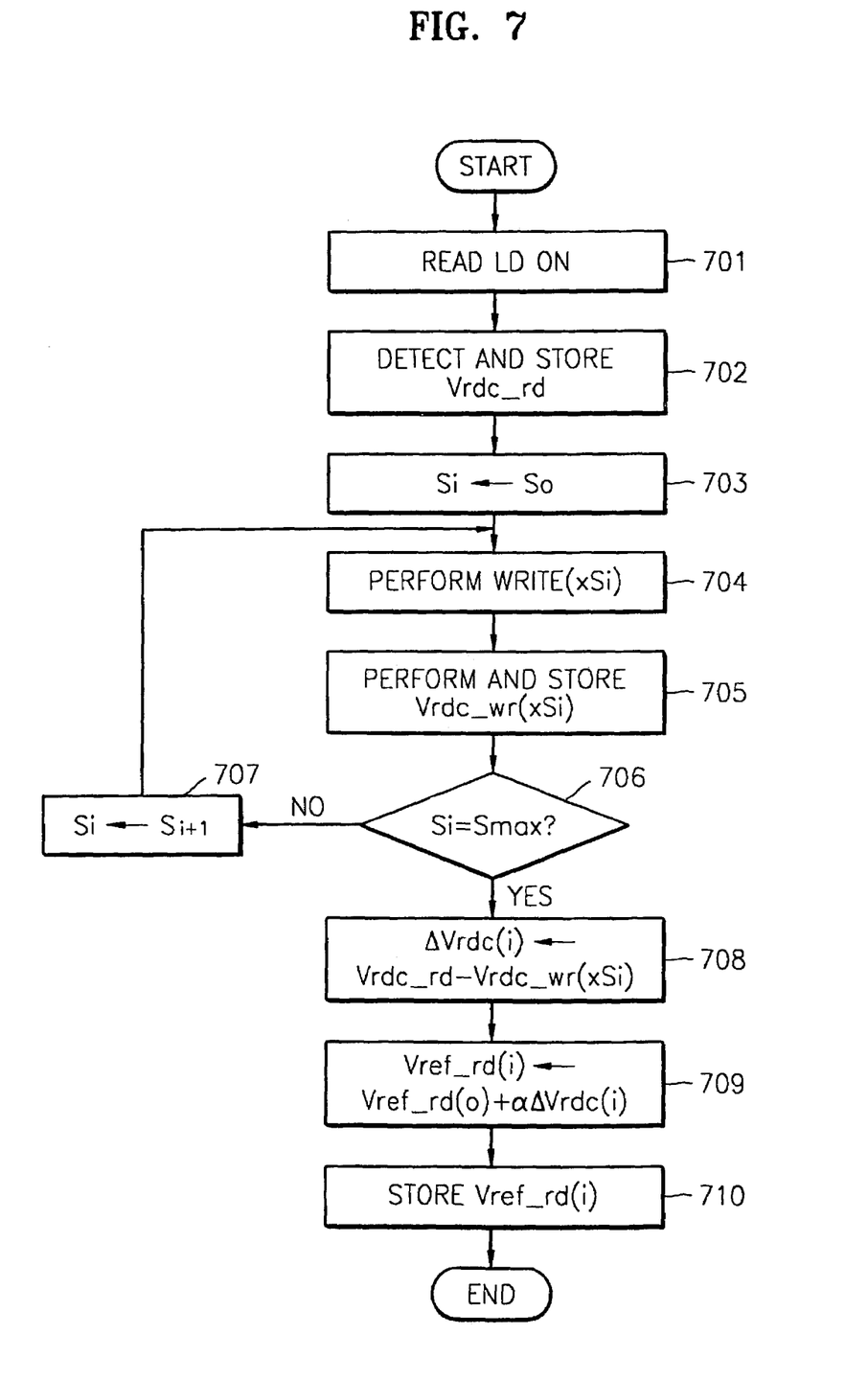
FIG. 7 is a flowchart illustrating a laser power control method used in a disc drive, according to the present invention.

A process of setting reference laser power data, which is performed by the system controller 320 by software, will now be explained with reference to a flowchart of FIG. 7.

First, in operation 701, a present mode is set to be a read mode and power for a disc drive (not shown) is automatically controlled by driving a read channel of the APC 360 so as to supply only read laser power to the laser diode LD.

Next, in operation 702, laser diode driving voltage Vrdc_rd output from the APC 360 in the read mode is detected and temporarily stored in the memory unit 340.

Then, a write speed ×Si of running the disc drive is set to be a minimum write speed $S_0$ in operation 703, and a writing operation of the disc drive is performed at the set write speed $S_0$ in operation 704.

Then, in operation 705, laser diode driving voltage Vrdc_wr output from the APC 360 at the set write speed ×Si in a read power period in the write mode is detected and temporarily stored in the memory unit 340, in operation 705.

Next, operation 706 checks whether or not the current write speed ×Si is a maximum write speed $S_{max}$.

If it is determined in operation 706 that the write speed ×Si is not the maximum write speed $S_{max}$, then in operation 707, the write speed ×Si is increased to a write speed $S_{i+1}$ and the method returns back to operation 704.

In other words, the system controller 320 performs the writing operation of the disc drive while increasing the minimum write speed S0 to the maximum write speed $S_{max}$. Also, the laser diode driving voltages Vrdc_wr(×Si) output from the APC 360 in a read power period, which are determined according to write speeds, are detected and temporarily stored in the memory unit 340.

If operation 706 determines that the current write speed ×Si is the maximum write speed $S_{max}$, then operation 708 calculates voltage differences Vrdc(i) between the laser diode driving voltage Vrdc_rd in the read mode and the laser diode driving voltages Vrdc_wr(×Si) in a read power period according to write speeds in the write mode.

In operation 709, reference laser power data Vref_rd(i) reducing a variation in read power according to write speeds is calculated by the following equation, using the voltage difference Vrdc(i) calculated in operation 708:

$$Vref\_rd(i)=Vref\_rd(0)+\alpha\Delta Vrdc(i) \qquad (1),$$

wherein $\alpha$ denotes a proportional factor, and Vref_rd(0) denotes a reference laser power voltage value in a read mode.

The proportional factor $\alpha$ is determined by experimentally measuring laser diode driving voltages according to reference laser power voltage output from the APC 360, and then calculating a ratio of the laser diode driving voltages.

After operation 709, several groups of the reference laser power data Vref_rd(i) for each read power period according to write speeds are classified by write speeds and stored in the memory unit 340, in operation 710.

Hereinafter, a process of controlling the level of laser power in a disc drive, using the several groups of the reference laser power data Vref_rd(i) for read power periods according to write speeds, will be described with reference to FIG. 3.

When the inputting unit 380 applies a write or read command to the system controller 320, the system controller 320 checks whether the input command is the write command or the read command and then appropriately controls related circuits.

If the write command is input to the system controller 320, the pulse generator 350 generates a write pulse to form a domain in a recording medium to correspond to data to be recorded, based on information regarding write speed stored in the system controller 320.

A process of generating a reference power control signal corresponding to write speeds, which is set by the inputting unit 380, using the system controller 320 will now be explained.

First, a reference power control signal generator 450 included in the system controller 320 reads, from the memory unit 340, reference laser power data Vref_rd(i) in a read power period, which corresponds to information on write speeds, and reads reference laser power data Vref_wr(i) in write power periods according to write speeds. Next, the reference power control signal generator 450 converts the reference laser power data for each of the read and write power periods into an analog signal and outputs the analog signal to the APC 360.

Then, the APC 360 controls laser diode driving voltages according to write speeds using the reference power control signals, which are input from the system controller 320, in the read and write power periods.

Hereinafter, a process of controlling the laser diode driving voltage according to write speed, will be described.

Figure 5:
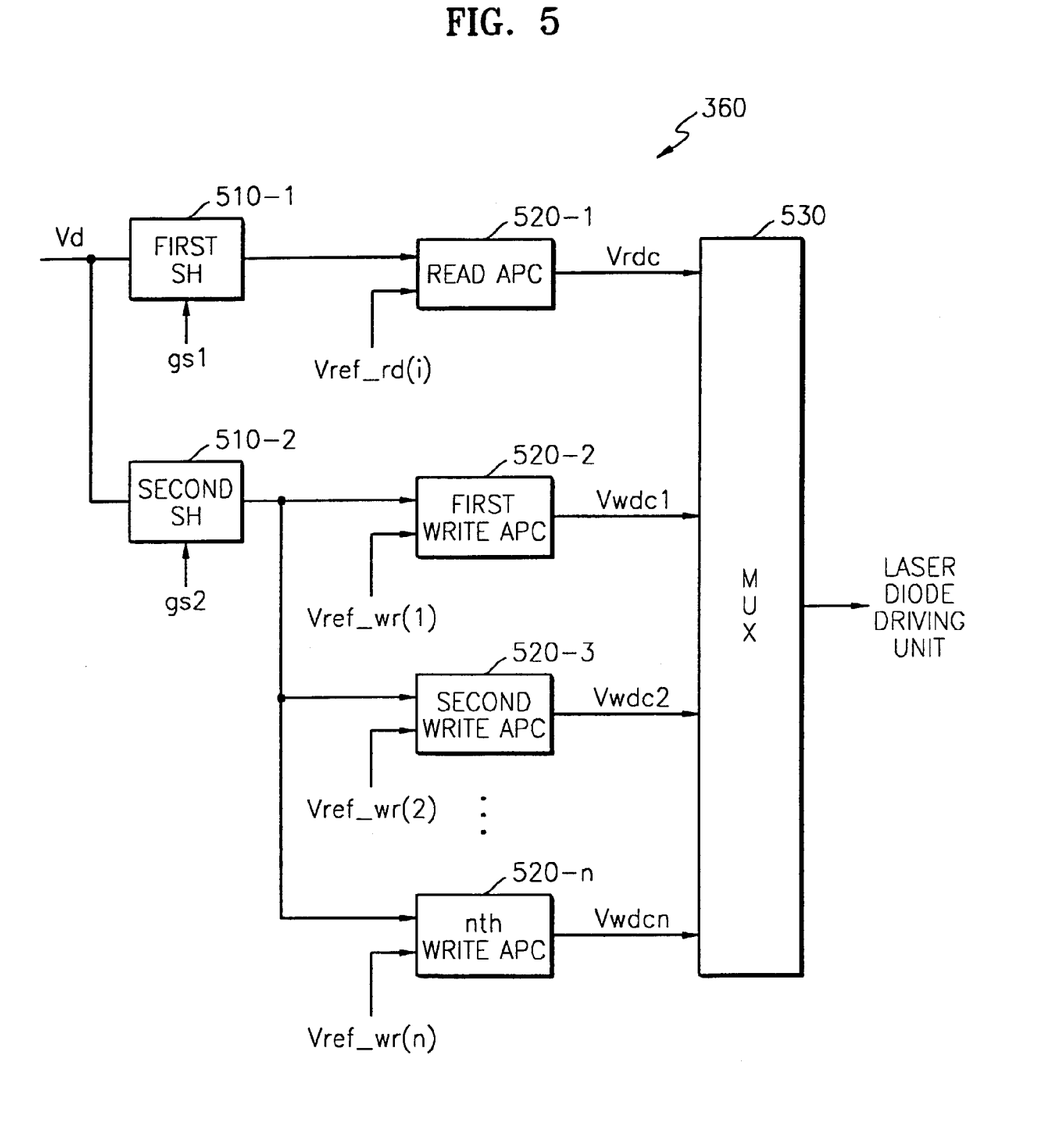
FIG. 5 is a block diagram of the structure of an automatic power controller shown in FIG. 3.

As shown in FIG. 5, the APC 360 includes a first sampling and holding (SH) unit 510-1, a second SH unit 510-2, a read-channel APC circuit 520-1 (hereinafter, "read APC 520-1"), a plurality of write-channel APC circuits 520-2 through 520-n automatically controlling power for writing channels according to write speeds (where n is an integer more than 1) (hereinafter, "first through n$^{th}$ write APCs" 520-2 through 520-n), and a multiplexer 530.

A voltage signal Vd input to the first and second SH unit 510-1 and 510-2 is obtained by inputting an optical signal reflected from the disc, which is output from the laser diode LD in a read or write mode, to the photodiode PD to be converted into an electrical signal and then inputting the electrical signal to the I/V converter 310 to be converted into the voltage signal Vd.

First, a method of automatically controlling laser diode driving voltage in the read mode will be described.

Only the first SH unit 510-1 and the read APC 520-1 operate in the read mode. A reference laser power signal Vref_rd(0), which is converted into an analog signal, is used as reference voltage of the read APC 520-1. The multiplexer 530 selects only signals output from the read APC 520-1 and outputs the selected signals to the LDD unit 370.

Second, a method of automatically controlling laser diode driving voltage in the write mode will be described.

In the write mode, the system controller 320 reads reference laser power data Vref_rd(i) for a read power period which corresponds to information on set write speeds, and reference laser power data Vref_wr(i) for write power period according to write speeds. Next, the system controller 320 converts the reference laser power data for the read power period and the write power period into analog signals and outputs the analog signals to the APC 360.

In the write mode, the level of laser diode power is automatically controlled by dividing the laser diode power into two parts, i.e., a write power period and a read power period, depending on whether recording pits are formed thereon or not. Also, in order to change the level of write power according to write speed, the laser diode driving voltage is controlled with a plurality of write APCs 520-2 through 520-n.

Figure 6C:
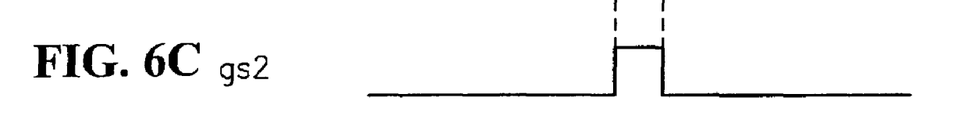

Further, in the write mode, the first SH unit 510-1 samples and holds the voltage signal Vd detecting the level of laser power in the read power period, in response to the gating signal gs1 of FIG. 6B. The second SH unit 510-2 samples and holds the voltage signal Vd in the write power period in response to the gating signal gs2 of FIG. 6C, and outputs the held voltage signals to the read APC 520-1 and the write APCs 520-2 through 520-n.

In the read power period, the read APC 520-1 controls the level of the signal input from the first SH unit 510-1 to be the same as the level of the reference laser power voltage Vref_rd(i) of an analog signal in the read power period determined according to write speeds applied by the system controller 320.

Also, in the write power period, one selected from a plurality of write APCs 520-2 through 520-n, according to write speeds, controls the level of the signal input from the second SH unit 510-2 to be same as the level of the reference laser power voltage Vref_wr(i), which is an analog signal applied from the system controller 320 in the write power period.

In the write mode, the multiplexer 530 selects a signal output from the read APC 520-1 and outputs the signal to the LDD unit 370 in the read power period, and selects a signal output from a write APC 520-2, . . . , or 520-n according to write speeds and outputs the signal to the LDD unit 370 in the write power period.

The LDD unit 370 receives the laser diode driving voltage output from the multiplexer 530, converts the voltage into a current signal, and outputs the current signal to the laser diode LD. Accordingly, it is possible to prevent a variation in the level of read power for a laser diode, according to write speeds of a disc drive, in a write mode.

As described above, according to the present invention, in a write mode of a disc drive, the level of laser power is automatically controlled to prevent fluctuation in laser diode driving voltage in a read power period according to write speeds of the disc drive. Therefore, it is possible to effectively prevent unstable operations of a servo circuit due to fluctuation of the laser power or a change in the level of a wobble signal, and further, stabilizing recording characteristics of a disc drive.

The present invention may be embodied as a method, an apparatus or a system. In a case where the present invention is accomplished by software, code segments for performing indispensable operations are required as constitutional elements. A program or code segments may be stored in a processor-readable medium or may be transmitted via a transmitting apparatus or network in response to a computer data signal that is combined with a carrier wave. Here, the processor-readable medium may be any medium capable of storing or transmitting data, e.g., an electronic circuit, a semiconductor memory device, a ROM, a flash memory, an EE PROM, a floppy disk, an optical disc, a hard disc, an optical fiber medium, or a radio-frequency (RF) net. Also, the computer data signal may be any signal that can be transmitted over a transmission medium such as electronic net channel, an optical fiber, air, an electric field, or an RF net.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus controlling laser power in a disc drive, comprising:
    a memory unit which stores reference laser power data according to write speeds, the reference laser power data being set to compensate for a variation in driving voltage input to a laser diode;
    a system controller which reads reference laser power data corresponding to a set write speed from the memory unit in a write mode and generates a reference power control signal corresponding to the reference laser power data; and
    an automatic power controller which controls the level of voltage, which corresponds to an optical signal output from the laser diode, to be the same as that of the voltage of the reference power control signal,
    wherein the reference laser power data comprises reference read power data that is set according to the write speeds in the write mode.

2. The apparatus of claim 1, further comprising a reference laser power data generator, the reference laser power data generator:
    detecting laser diode driving voltage in a read mode;
    detecting laser diode driving voltages in read power periods according to the write speeds in the write mode
    calculating voltage differences among the laser diode driving voltage in the read mode and the laser diode driving voltages in the read power periods according to the write speeds; and
    generating reference laser power data regarding each of the voltage differences calculated during the calculation of the voltage differences, the reference laser power data reducing a variation in the read power according to the write speeds.

3. An apparatus generating reference laser power data for controlling laser power -in a disc drive, comprising:

a photodetector which converts an optical signal output from a laser diode into an electrical signal in a read mode and a write mode according to write speeds;
    a sampling and holding unit which samples and holds the electrical signal output from the photodetector in a read power period;
    a subtracter that calculates voltage differences between read power sample and hold voltage output from the sampling hold unit in the read mode and sample and hold voltage in read power periods, according to the write speeds, in the write mode;
    an operation unit which generates reference laser power values corresponding to the voltage differences calculated by the subtracter, the reference laser power values reducing a variation in read power according to the write speeds in the write mode; and
    a memory unit to record information regarding the reference laser power values according to the write speeds.

4. The apparatus of claim 3, further comprising:
    a plurality of write channel circuits controlling power of writing channels according to the write speeds; and
    wherein the sampling and holding unit comprises a plurality of sampling and holding units.

5. A method of controlling laser power in a disc drive, comprising:
    generating reference laser power data compensating for a variation in laser diode driving voltage according to write speeds, and storing the reference laser power data in a memory unit;
    reading from the memory unit reference laser power data corresponding to the write speeds set in a write mode; and
    controlling the laser diode driving voltage so as to make the level of voltage corresponding to an optical signal output from laser diode of the disc drive be the same as that of voltage corresponding to the reference laser power data,
    wherein the reference laser power data comprises reference read power data according to the write speeds in the write mode.

6. The method of claim 5, wherein the reference laser power data is created by a process comprising:
    detecting laser diode driving voltage in a read mode;
    detecting laser diode driving voltages in read power periods according to the write speeds in the write mode;
    calculating voltage differences between the laser diode driving voltage in the read mode and the laser diode driving voltages in the read power periods, according to the write speeds, in the write mode; and
    generating reference laser power data reducing a variation in read power according to the write speeds to correspond to the voltage differences according to the write speeds.

7. A method of generating reference laser power data for controlling laser power -in a disc drive, comprising:
    detecting laser diode driving voltage in a read mode;
    detecting laser diode driving voltages in read power periods, according to write speeds, in a write mode;
    calculating voltage differences between the laser diode driving voltage in the read mode and the laser diode driving voltages in the read power periods, according to the write speeds, in the write mode; and
    generating reference laser power data reducing a variation in read power, according to the write speeds, to correspond to the voltage differences according to the write speeds.

8. A method of generating reference laser power data to reduce a variation in read power at a write speed, thereby controlling laser power in a disc drive, comprising:

detecting a read voltage in a read period (Vrdc_rd);

detecting a write voltage during the read period (Vrdc_wr);

calculating a voltage difference ΔVrdc as Vrdc_rd-Vrdc_wr and generating and storing the reference laser power data according to:

Vref_rd=Vref_rd(0)+αΔVrdc, wherein Vref_rd(0) is a reference power laser voltage in the read period and α is a proportional factor.

9. The method of claim 8, further comprising:

selecting a read mode to perform a read operation in the read period.

10. The method of claim 8, further comprising:

temporarily storing the read voltage in the read period (Vrdc_rd); and recalling the stored Vrdc_rd stored to perform the calculating the voltage difference ΔVrdc.

11. The method of claim 8, further comprising:

setting the write speed to a minimum write speed.

12. The method of claim 8, further comprising selecting a write mode to perform a write operation at the write speed, detecting the write voltage during the read period Vrdc_wr.

13. The method of claim 12, further comprising:

incrementally increasing the write speed until the write speed is a maximum, and if the write speed is not the maximum, then repeating the selecting the write mode and the detecting the write voltage during the read period Vrdc_wr or if the write speed is the maximum, then proceeding to the calculating the voltage difference ΔVrdc.

14. The method of claim 13, further comprising:

recording the detected write voltage during the read period Vrdc_wr for each incremental write speed.

15. The method of claim 8, further comprising:

selecting an automatic power controller from a plurality of automatic power controllers to control a signal input during a write mode; and controlling the signal input to be the same as the reference laser power voltage Vref_rd.

16. A method of generating laser power reference values for controlling laser power in a disc drive, comprising:

performing a write operation;

increasing a write speed from a minimum write speed to a maximum write speed during the write operation;

detecting driving voltages as the write speed increases, including read driving voltages as the write speed increases; and storing the detected driving voltages at the increasing write speed as reference driving voltages.

17. A method of generating laser power reference values for controlling laser power in a disc drive, comprising:

setting a write speed to a maximum write speed;

calculating a voltage difference between the laser diode driving voltage in a read mode and the laser diode driving voltage in a read power period immediately after a transition from a write mode to the read mode; and determining and storing a reference read voltage for the set write speed based on the calculated voltage difference, without all stored reference read voltages being required to be identical for different write speeds.

18. A method of generating laser power reference values for controlling laser power in a disc drive, comprising:

setting a write speed to a maximum write speed;

calculating a voltage difference between the laser diode driving voltage in a read mode and the laser diode driving voltage in a read power period immediately after a transition from a write mode to the read mode for the generation of the laser cower reference values; and determining if the write speed is the maximum write speed, wherein the calculating comprises calculating the voltage difference if the write speed is the maximum write speed.

19. A method of controlling fluctuation in a laser diode driving voltage of a disc drive, comprising:

automatically controlling a level of laser power in a write mode to prevent fluctuation of the laser diode driving voltage during a read power period according to write speeds of the disc drive, based on reference read values dependent on the write speeds.

* * * * *

UNITED STATES PATENT AND TRADEMARK OFFICE
CERTIFICATE OF CORRECTION

PATENT NO.         : 7,248,551 B2
APPLICATION NO. : 10/438201
DATED              : July 24, 2007
INVENTOR(S)       : Sung-un Yang It is certified that error appears in the above-identified patent and that said Letters Patent is hereby corrected as shown below:

Column 7, Line 55, after "mode" insert --;--.

Column 7, Line 66, change "-in" to --in--.

Column 8, Line 55, change "-in" to --in--.

Column 9, Line 7-8, after "Vrdc_wr" insert --;--.

Column 9, Line 35, after "Vrdc_wr" insert --,--.

Column 10, Line 30, change "cower" to --power--.

Signed and Sealed this

Eleventh Day of December, 2007

JON W. DUDAS
*Director of the United States Patent and Trademark Office*